United States Patent
Ley et al.

(10) Patent No.: US 9,745,705 B2
(45) Date of Patent: Aug. 29, 2017

(54) RUNNER SEGMENT FOR AN EDGE GUARD OF A ROAD MILLING MACHINE, AND EDGE GUARD FOR A ROAD MILLING MACHINE

(71) Applicant: Wirtgen GmbH, Windhagen (DE)

(72) Inventors: Herbert Ley, St. Katharinen (DE); Philip Verhaelen, Köln (DE); Cyrus Barimani, Königswinter (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 14/806,711

(22) Filed: Jul. 23, 2015

(65) Prior Publication Data
US 2016/0024727 A1 Jan. 28, 2016

Related U.S. Application Data

(63) Continuation of application No. 13/792,721, filed on Mar. 11, 2013, now Pat. No. 9,089,087.

(30) Foreign Application Priority Data

Apr. 19, 2012 (DE) .................. 10 2012 103 441

(51) Int. Cl.
| | |
|---|---|
| *E01C 23/12* | (2006.01) |
| *B23Q 11/08* | (2006.01) |
| *E01C 23/09* | (2006.01) |
| *A01B 76/00* | (2006.01) |
| *E01C 23/08* | (2006.01) |
| *E01C 23/088* | (2006.01) |
| *B23P 6/00* | (2006.01) |
| *E01C 23/02* | (2006.01) |

(52) U.S. Cl.
CPC .............. *E01C 23/09* (2013.01); *A01B 76/00* (2013.01); *B23P 6/00* (2013.01); *E01C 23/026* (2013.01); *E01C 23/08* (2013.01); *E01C 23/088* (2013.01); *E01C 23/127* (2013.01); *E01C 2301/00* (2013.01); *E01C 2301/20* (2013.01); *Y10T 29/4973* (2015.01); *Y10T 74/2191* (2015.01)

(58) Field of Classification Search
CPC ...... B63Q 11/08; B63Q 11/0825; E01C 23/12
USPC ........................ 172/508; 74/608, 609; 404/94
See application file for complete search history.

(56) References Cited

U.S. PATENT DOCUMENTS

| | | |
|---|---|---|
| 348,941 A | 9/1886 | Witt |
| 371,516 A | 10/1887 | Nuckols |
| 893,371 A | 7/1908 | Raper |
| 964,412 A | 7/1910 | Faris et al. |
| 1,106,278 A | 8/1914 | Brumfield |
| 1,463,641 A | 7/1923 | Ward et al. |
| 2,249,872 A | 7/1941 | Turner |

(Continued)

OTHER PUBLICATIONS

Exhibit A: Enlarged photos of prior art runner segment designs as discussed in paragraph [0002] of this application, and taken from pp. 15 and 32 of Exhibit B. (undated but admitted to be prior art).

(Continued)

*Primary Examiner* — Gary Hartmann
(74) *Attorney, Agent, or Firm* — Lucian Wayne Beavers; Patterson Intellectual Property Law, PC

(57) ABSTRACT

A runner segment for an edge guard includes an insertion projection that can be inserted into an insertion receptacle of the edge guard.

19 Claims, 4 Drawing Sheets

(56) References Cited

U.S. PATENT DOCUMENTS

| | | | |
|---|---|---|---|
| 2,835,517 A | | 5/1958 | Beerli |
| 3,041,752 A | | 7/1962 | Evans |
| 4,483,515 A | * | 11/1984 | Maryonovich ............ B66F 3/16 |
| | | | 254/103 |
| 5,489,162 A | | 2/1996 | LoCicero et al. |
| 6,431,249 B1 | * | 8/2002 | Tabellini ............ B23Q 11/0825 |
| | | | 160/202 |
| 6,682,254 B1 | | 1/2004 | Olofsson et al. |
| 7,897,005 B2 | | 3/2011 | Knauseder |
| 8,640,570 B2 | * | 2/2014 | Viola ................. B23Q 11/0825 |
| | | | 74/612 |
| D726,775 S | * | 4/2015 | Ley ............................... D15/28 |
| D726,776 S | * | 4/2015 | Ley ............................... D15/28 |
| D726,777 S | * | 4/2015 | Ley ............................... D15/28 |
| 9,089,087 B2 | * | 7/2015 | Ley ........................ A01B 76/00 |
| 2009/0185859 A1 | | 7/2009 | Haroldsen |

OTHER PUBLICATIONS

Exhibit B: Catalog of Cold Milling Machine W210/W210i from Wirtgen GmbH, with photos of prior art runner segment designs as discussed in paragraph [0002] of the present application circled. (undated but admitted to be prior art).

Exhibit C: Catalog of Cold Milling Machine W2100 from Wirtgen GmbH, with photos of prior art runner segment designs as discussed in paragraph [0002] of the present application circled. (undated but admitted to be prior art).

* cited by examiner

RUNNER SEGMENT FOR AN EDGE GUARD OF A ROAD MILLING MACHINE, AND EDGE GUARD FOR A ROAD MILLING MACHINE

BACKGROUND OF THE INVENTION

1. Field of the Invention

The invention relates to a runner segment for an edge guard of a road milling machine or similar soil working machine, having a runner portion onto which a fastening portion is indirectly or directly shaped.

2. Description of the Prior Art

Road milling machines are used for road and path construction. They serve in that context to completely or, preferably, partly remove the existing roadway material, in which context a milling drum is used which is accommodated in protected fashion inside a drum housing. The milling drum is usually fitted with bits that engage into the substrate being processed for roadway material removal. Protective elements referred to as "edge guards" are inserted on the sides of the drum housing that extends in the travel direction of the road milling machine. The edge guard covers the milling drum on the side, and thus on the one hand prevents access to the milling drum during milling operation, and on the other hand prevents milled-off material from being ejected into the surroundings. The edge guard rests on the roadway surface with a lower skid runner, so that complete coverage of the milling drum is achieved. The skid runner furthermore presses onto the unprocessed roadway material that is located outside the working region adjacent to the milling drum. The edge guard consequently and accordingly forms a buttress that prevents the laterally adjacent roadway material from breaking away during the milling process. The skid runner is assembled from runner segments, which are subject to a certain amount of wear and therefore must be replaced after reaching their wear limit. The runner segments comprise for this purpose a fastening portion with which they are bolted laterally onto the edge guard. The bolt heads of the runner segments are on occasion exposed to the abrasive attack of removed material, and then become ground down. They can then no longer be loosened using the intended tool. It may further happen that the attachment surfaces between the edge guard and the runner segments become eroded. The runner segments can then no longer be positioned in an exactly reproducible manner.

SUMMARY OF THE INVENTION

It is an object of the invention to make available a runner segment for an edge guard that enables simple maintenance.

A further object of the invention is to make available an edge guard of the kind mentioned above that facilitates simple maintenance.

The object relating to the runner segment is achieved in that the fastening portion of the runner segment is embodied as an insertion projection. The runner segment can thus be inserted, with the insertion projection, into a correspondingly embodied insertion receptacle of the edge guard so that it can easily be replaced under harsh construction-site conditions. The insertion projection is arranged in the insertion receptacle in a wear-protected region, so that a reproducible correlation of the runner segment with the edge guard is facilitated.

To allow exact correlation of the individual runner segments among one another to be ensured in simple fashion, provision can be made that at least one stop surface is provided which extends transversely to the longitudinal center axis, defining the insertion direction, of the insertion projection. The runner segment can consequently be slid with its insertion projection into the edge guard until the stop surface limits the insertion motion in defined fashion.

Provision can particularly preferably be made in this context that the insertion projection comprises a stop with which the insertion motion is limitable. The stop is consequently accommodated in wear-protected fashion in the region of the insertion projection.

Installation can be further simplified by the fact that the insertion projection is equipped in the region of its free end with at least one shaped-on introduction centering feature.

If provision is made that the insertion projection comprises, on oppositely located sides, support flanks that extend transversely to the running direction of the runner segment, positively engaged bracing in the principal force direction on the edge guard during operational use can then be achieved.

Particularly preferably, the support flanks extend parallel to one another, or converge in the insertion direction of the insertion projection. Converging surface regions furthermore result in a tapered geometry of the insertion projection that simplifies introduction into the insertion receptacle. According to an alternative variant of the invention, provision also can be made that the support flanks comprise surface regions that are of convex or concave conformation. Such surface regions offer large removal surface regions promoting lower surface pressures.

It may also happen during operational use that the road milling machine is displaced transversely to the principal direction of travel. In order to maintain reliable immobilization of the runner segments in this operating state as well, provision can be made that the insertion projection comprises, on oppositely located sides, lateral surfaces extending in the running direction of the runner segment. The runner segment can be positively braced with these lateral surfaces against corresponding counter-surfaces of the edge guard.

Road milling machines are also often moved oppositely to the principal direction of travel during operational use. This causes load situations on the runner segment that deviate from those in the context of operation in the principal travel direction. To allow a load-optimized design of the runner segment to be achieved in this context, provision is made according to a variant of the invention that the insertion projection exhibits an asymmetrical geometry with respect to a transverse center plane proceeding through the longitudinal central axis of the insertion projection and extending transversely to the running direction of the runner segment.

According to a conceivable alternative invention, provision can be made that at least one protrusion protruding in the running direction is provided, which projects beyond the insertion projection in or oppositely to the running direction. The protrusion serves to span edge guard regions located between the individual runner segments, and thus enables a maximally gap-free runner embodiment.

A compact configuration of the runner segment is facilitated by the fact that a projection that carries the runner portion indirectly or directly adjoins the insertion projection.

Provision can be made in particular, in this context, that the runner portion has a greater width than the projection. With a cross-sectional offset of this kind, a labyrinthine overlap of the entry into the insertion receptacle can be achieved. Penetration of dirt into the insertion receptacle is thereby decreased.

A high level of wear resistance for the runner segment can be achieved by the fact that a hard-material element, for example a hardface weld, a hard-metal element, a hard-material coating, or the like, is applied onto the runner portion.

A particularly preferred variant of the invention is such that a clamp element that comprises one or more elastic functional parts is used. With the clamp element, the runner segment can be secured in simple fashion on the edge guard, such that because of the elasticity of the functional parts, the connection can easily be fitted and released. Particularly preferably, the clamp element is retained in the region of the insertion projection so that it is accommodated in a manner protected from wear.

Particularly simple correlation of the clamp element with the runner segment can be achieved when the insertion projection comprises a receptacle, in the form of a cutout or recess, into which the clamp element is introduced. The elasticity of the clamp element can, in particular, also be utilized in order to achieve retention in the receptacle, so that additional fastening measures can be omitted.

That object of the invention which relates to the edge guard, for a road milling machine or similar soil processing machine, having an edge that is embodied for the reception of runner segments, is achieved in that the edge comprises insertion receptacles for reception of the runner segments. The runner segments can be inserted easily, preferably without tools, into the insertion receptacles. An insertion projection of the runner segment is accommodated in wear-protected fashion in the insertion receptacles, and the runner segments can be fitted reproducibly into the insertion receptacles. Maintenance of the edge guard is thereby considerably simplified.

Particularly preferably, the insertion receptacles are of pocket-shaped configuration and are open toward the underside of the edge guard. Simple production of the edge guard is possible when provision is made that the edge comprises apertures, embodied in comb-like fashion, that are at least locally closed with partitions spaced apart in parallel fashion from one another in order to form the receptacles.

BRIEF DESCRIPTION OF THE DRAWINGS

The invention will be further explained below with reference to exemplifying embodiments depicted in the drawings, in which.

DETAILED DESCRIPTION

Figure 1:
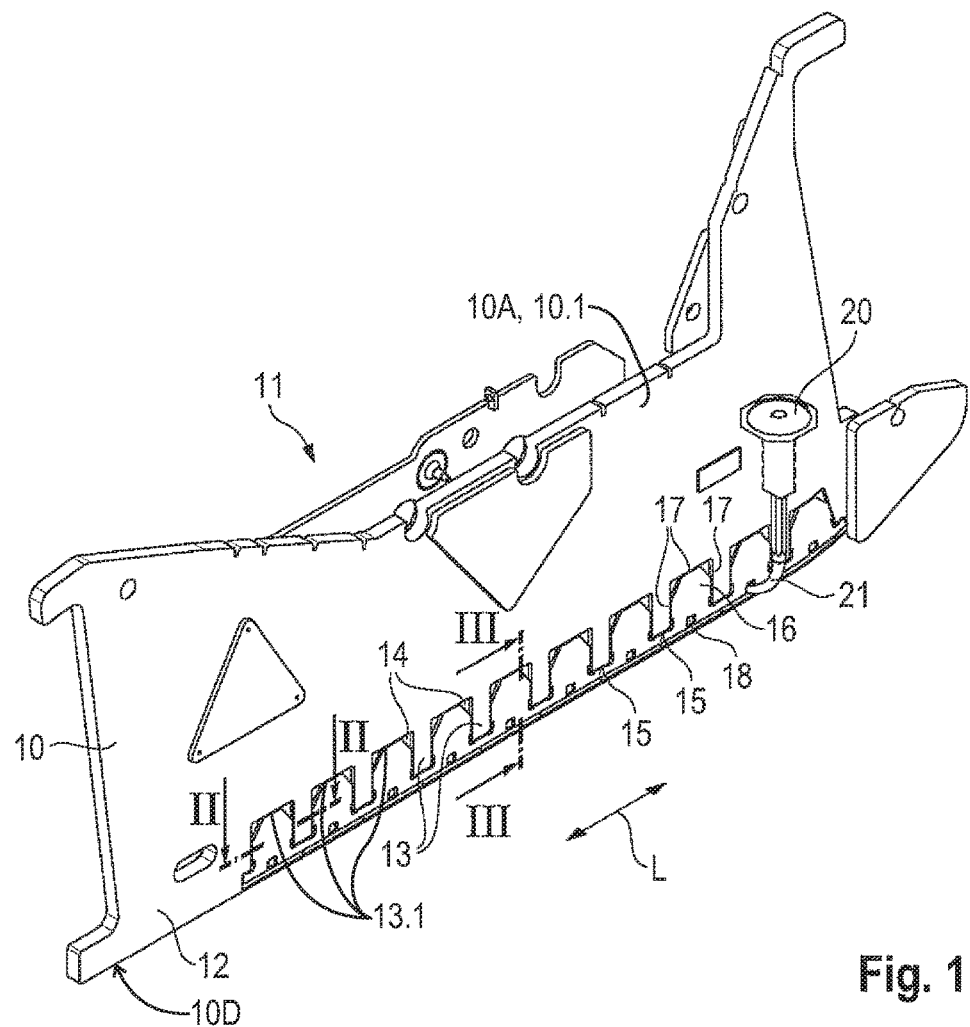
FIG. 1 is a perspective depiction of an edge guard for a road milling machine.
Figure 2:
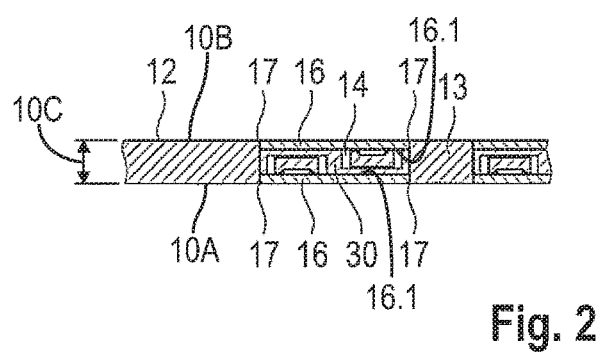
FIG. 2 is a detail section labeled II-II in FIG. 1.
Figure 3:
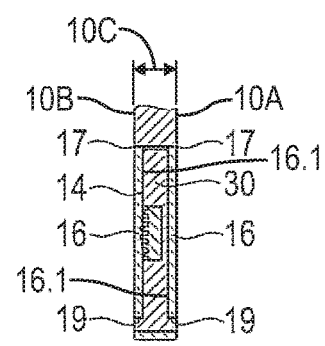
FIG. 3 is a detail section labeled III-III in FIG. 1.

FIG. 1 shows an edge guard 10 for a road milling machine, having a base part 10.1 of plate-like configuration. Base part 10.1 is formed from metal plate having opposite parallel lateral plate surfaces 10A and 10B, and having a plate width 10C defined between the lateral plate surfaces 10A and 10B. This base part 10.1 forms a fastening side 11 for coupling onto the road milling machine in the region of a drum housing. Located oppositely to fastening side 11, edge guard 10 comprises an edge 12. Edge 12 may also be referred to as a lower edge portion 12. This edge 12 is equipped with cutouts 13.1 that are arranged spaced apart from one another by way of webs 13, resulting in a comb-like geometry. Partitions 16 made of sheet metal are inserted into the gaps or cutouts 13.1 formed between webs 13. Two respective partitions 16 that are arranged spaced apart and parallel to one another are inserted into each cutout. The partitions 16 have inner sides 16.1. This produces, between partitions 16 and webs 13, an insertion receptacle 14 as illustrated by FIGS. 2 and 3. Partitions 16 are welded to edge 12 of edge guard 10 via weld bead connections 17. The result is to create a plurality of insertion receptacles 14, arranged spaced apart from one another at a uniform pitch. The insertion receptacles 14 are open toward an underside 10D of the edge guard 10. These insertion receptacles 14 serve to receive runner segments 30, as shown in more detail by way of example in FIGS. 4 to 9. Runner segments 30 are of substantially similar construction in terms of basic construction. They comprise a runner portion 36 that is lined on its underside with a hard-material element 37. A facing made of metal powder can be used, for example, as hard-material element 37. It is also conceivable for hard-metal elements or a hard-facing weld to be applied onto the runner portion. A projection 31 is shaped onto runner portion 36. Projection 31 has a narrower width than runner portion 36 transversely to the running direction L extending in the principal direction of motion of the road milling machine. This results in shoulder-like portions on either side of projection 31 that form abutment surfaces 36.1. Projection 31 comprises two protrusions 32 that protrude on both sides in running direction L beyond an insertion projection 38. Protrusions 32 form stop surfaces 33 that transition via fillet transitions 34 into side walls 35.

Insertion projection 38 is demarcated by two lateral surfaces 38.3 extending in running direction L. Lateral surfaces 38.3 are parallel to one another. Lateral surfaces 38.3 transition without shoulders into projection 31.

Figure 4:
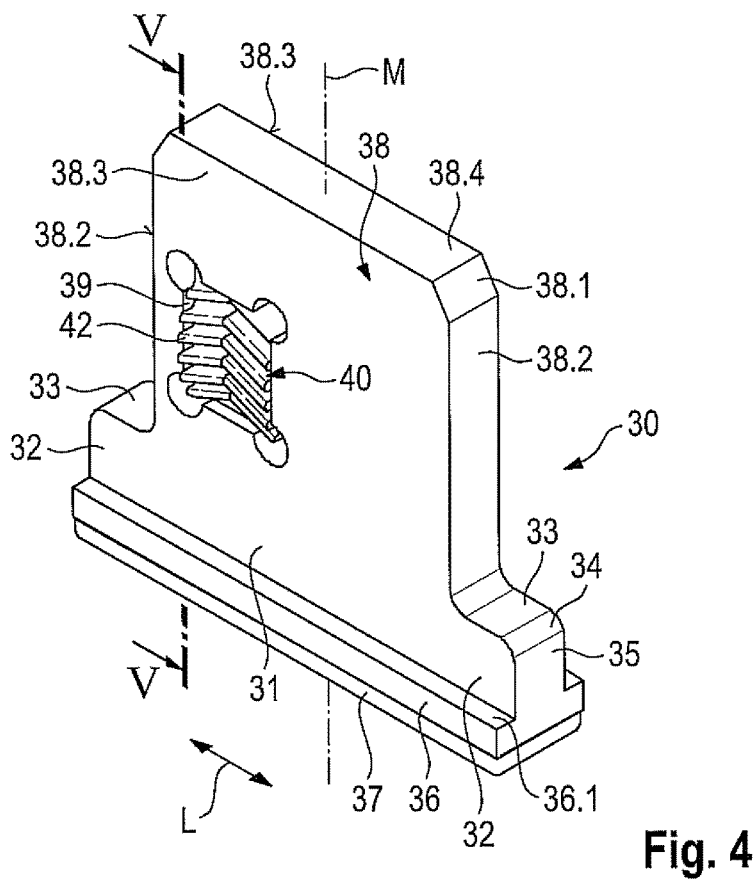
FIG. 4 is a perspective depiction of a first variant of a runner segment.
Figure 5:
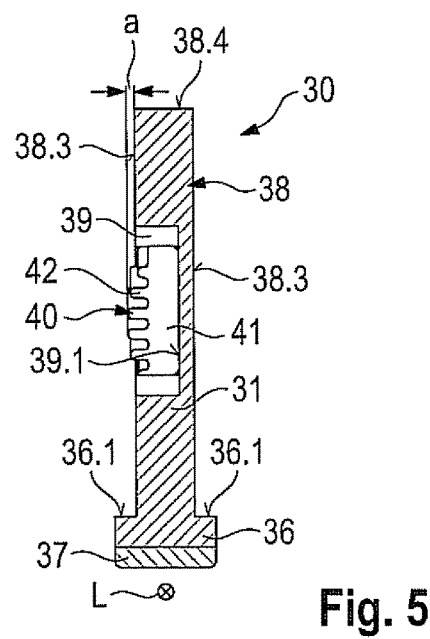
FIG. 5 is a sectioned depiction of the runner segment according to FIG. 4 along the section line labeled V-V therein.

As shown by the variant configuration according to FIGS. 4 and 5, insertion projection 38 comprises two support flanks 38.2 that are perpendicular to lateral surfaces 38.3 and extend parallel and spaced apart from one another. Each support flank 38.2 transitions via an introduction centering feature 38.1 into an end face 38.4.

A clamp element 40 is fastened in the region of insertion projection 38. Clamp element 40 comprises elastic functional parts 42 that are embodied predominantly as louvers, as is apparent from FIG. 5. It is also conceivable to use a clamp element that is embodied in block-like fashion and is constituted from a elastic material, in which context a part of said block, or the entire block, constitutes the functional part having elastic properties. The louver-like functional parts 42 are set in arrow-shaped fashion with respect to one another and are inclined toward the insertion axis that defines longitudinal center axis M of the insertion projection. As is evident from FIG. 5, clamp element 40 comprises a base part 41 onto which functional parts 42 are integrally shaped. A pocket-shaped receptacle 39 in the form of a cutout is recessed into insertion projection 38. Clamp element 40 is inserted with its base part 41 into said receptacle 39, being braced with its base part 41 against a bottom 39.1 of the receptacle. In the present case clamp element 40 is embodied in such a way that base part 41 also has elastic properties. It can then be pressed with an overdimension into receptacle 39 so that no additional fastening means are necessary. Alternatively, clamp element 40 can also, for example, be adhesively bonded into receptacle 39. In the installed state, functional parts 42 protrude slightly beyond lateral surface 38.3, as is evident from FIG. 5. The protrusion is labeled a in FIG. 5. For the installation of runner segment 30 shown in FIGS. 4 and 5 in edge guard 10 according to FIG. 1, runner segment 30 is firstly placed with its insertion projection 38 against insertion receptacle 14 that is open toward the bottom. Introduction centering features 38.1 thereby thread onto the adjacent webs 13 so that installation is made easier. Runner segment 30 is then pushed with its insertion projection 38 toward longitudinal center axis M into insertion receptacle 14. This can occur at first with no effort or with little expenditure of effort, until functional parts 42 come into engagement against the inner sides of partitions 16. Functional parts 42 must be elastically deformed upon insertion of runner segment 30. The insertion motion of runner segment 30 into insertion receptacle 14 is limited by stop surfaces 33 of protrusions 32. These abut against end faces 15 of webs 13. In the installed state, abutment surface 36.1 of runner portion 36 is at a short distance from an end-located counter-surface 19 of partitions 16, as is evident from FIG. 3. End face 38.4 is likewise at a distance from an oppositely located bottom surface of insertion receptacle 14. Alternatively, the correlation can be selected in such a way that runner segment 30 becomes braced with end face 38.4 against a bottom surface of insertion receptacle 14. Stop surface 33 is then correspondingly at a short distance from the end face of webs 13. The stop geometry between runner segment 30 and insertion receptacle 14 is then accommodated in protected fashion in insertion receptacle 14. Alternatively, clamp element 40 can also be accommodated on base part 10.1, in particular protected in insertion receptacle 14.

During operational use, runner segments 30 scrape with their hard-material elements 37 over the substrate and are thereby continually worn away. Once the wear limit has been reached, runner segments 30 can easily be replaced. For deinstallation, window-like openings 18 are provided in the externally located partitions 16. A tool 20 having a drift punch 21 can be placed into these openings 18. Drift punch 21 then braces against abutment surface 36.1 of runner portion 36. A driving-out force can then be applied vertically downward into runner segment 30 by means of a hammer blow. The frictionally engaged connection between the inner side of partition 16 and clamp element 40 is then released by sliding out runner segment 30. Runner segment 30 can then be pulled completely out of insertion receptacle 14 and replaced with a new runner segment 30.

Thus methods of repairing an edge guard of a construction machine are provided. Such a method may include providing an edge guard including an edge portion having a plurality of insertion receptacles, and including a plurality of runner segments, each of the runner segments including a runner portion and an insertion projection, each of the insertion projections being received in one of the insertion receptacles, one or more of the runner portions being worn. A worn runner segment having a worn runner portion is removed by withdrawing the insertion projection of the worn runner segment from its associated insertion receptacle as described above. The worn runner segment is then replaced with a new runner segment by inserting the insertion projection of the new runner segment into the insertion receptacle from which the worn runner segment was taken.

Figure 6:
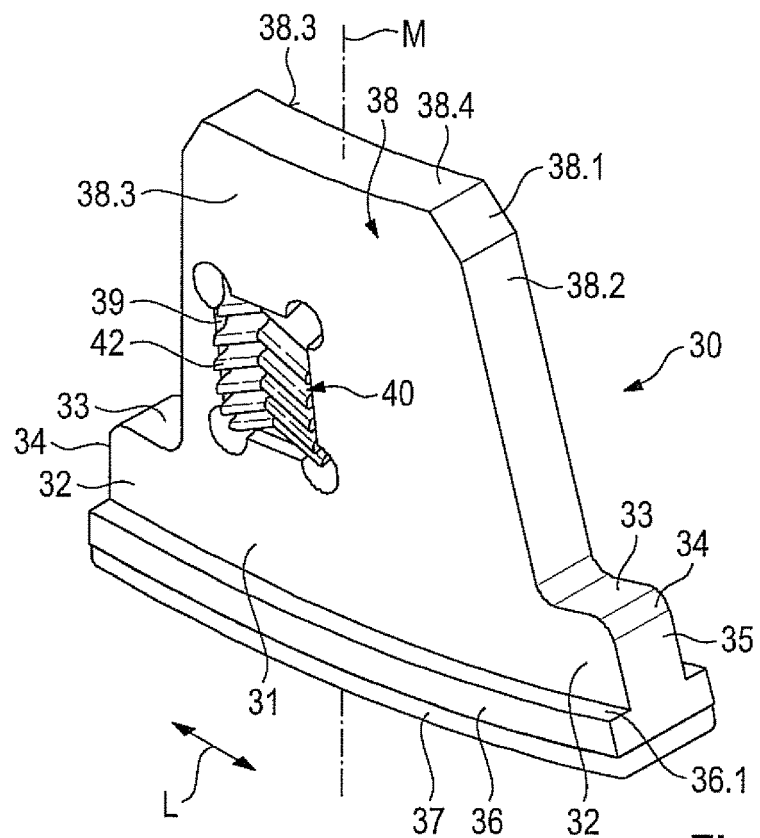
FIG. 6 is a perspective depiction of a second variant configuration of a runner segment.

FIG. 6 depicts an alternative variant embodiment of a runner segment 30. The conformation of this runner segment 30 corresponds substantially to runner segment 30 according to FIGS. 4 and 5, so that reference can be made to the statements made previously in order to avoid repetition. In contrast to runner segment 30 according to FIGS. 4 and 5, support flanks 38.2 are not parallel to one another but instead are set in a V-shape and converge toward the free end of insertion projection 38. Correspondingly, webs 13 are preferably configured in such a way that they form adapted angled stop surface regions that diverge in insertion receptacle 14 toward the bottom-side opening. This results in a conical seating-surface pairing between webs 13 and runner segment 30. This has the advantage that support flanks 38.2 already come out of engagement with the corresponding counter-surfaces of webs 13 after introduction of only a small driving-out motion toward longitudinal center axis M, so that no frictional forces are produced here while driving out.

Figure 7:
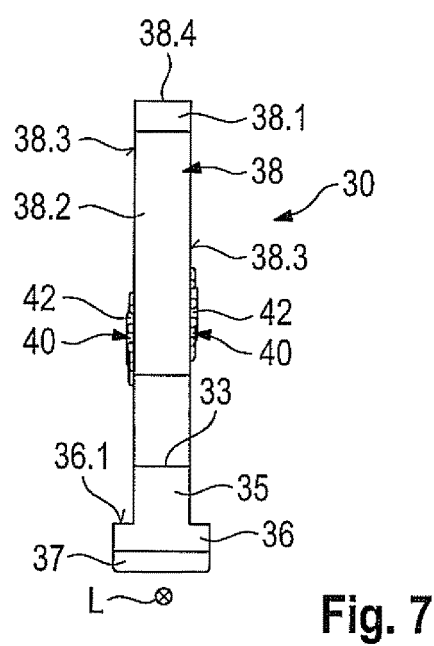
FIG. 7 is a side view of the runner segment according to FIG. 6.

As FIG. 7 shows, two pocket-shaped receptacles 39 corresponding to the configuration according to FIGS. 4 and 5 are introduced into insertion projection 38. Receptacles 39 are arranged with an offset from one another in running direction L, and elastic functional parts 42 of clamp elements 40 protrude on both sides of insertion projection 38. Double-sided clamping of insertion projection 38 in insertion receptacle 14 is thereby achieved. This type of clamping is of course possible for all runner segments 30. In contrast to runner segment 30 according to FIGS. 4 and 5, runner portion 36, and thus hard-material element 37, is of convex configuration. According to FIG. 1 this runner segment 30 is, for example, advantageously arranged at the front end of edge guard 10 and consequently forms a run-on ramp geometry.

Figure 8:
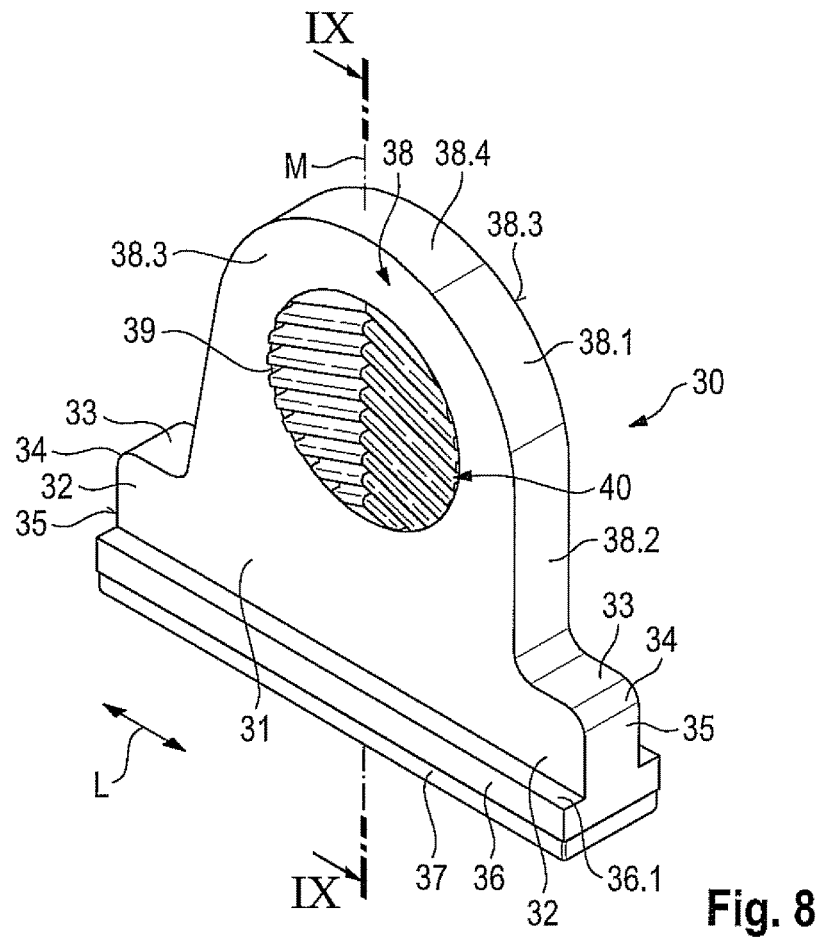
FIG. 8 is a perspective depiction of a third variant configuration of a runner segment.
Figure 9:
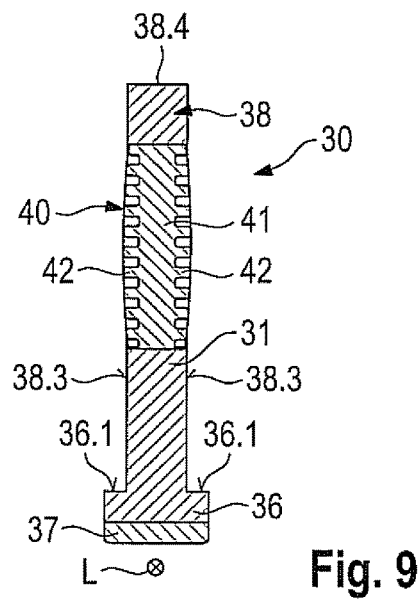
FIG. 9 shows a section along the transverse central plane, labeled IX-IX, of the runner segment according to FIG. 8.

FIGS. 8 and 9 depict a further variant configuration of a runner segment 30. Here as well, reference will be made to the statements made previously in order to avoid repetition with regard to identical reference characters. Only the differences will be explained below. As FIG. 8 shows, insertion projection 38 comprises two oppositely located support flanks 38.2. These possess firstly surface regions that are adjacent to stop surfaces 33 and are at an angle to one another. These surface regions converge toward the free end of insertion projection 38. Connected adjacently to the converging surface regions are shoulderless convex surface regions of support flank 38.2. These convex regions of support flanks 38.2 transition flush into one another via a likewise convex introduction centering feature. This geometry, too, makes possible accurately fitted and simple correlation of the insertion projection 38 with corresponding counter-surfaces of webs 13.

As shown in FIG. 9, clamp element 40 comprises a base part 41 on which louver-like elastic functional parts 42 are attached on both sides. The elastic functional parts 42 are once again set in an arrow shape for simplified introduction of insertion projection 38 into insertion receptacle 14, and protrude slightly on both sides beyond lateral surfaces 38.3 of insertion projection 38. Receptacle 39 is hollowed out of insertion projection 38 as a cavity. Upon introduction of insertion projection 38 into insertion receptacle 14 of edge guard 10, functional parts 42 slide along the inner sides of the two partitions 16 and are deformed there.

What is claimed is:
1. An edge guard for a road milling machine or a soil working machine, the edge guard comprising:
 a base part formed from metal plate having opposite parallel lateral plate surfaces, the metal plate having a plate width defined between the lateral plate surfaces, the metal plate having a lower edge portion having a plurality of insertion receptacles defined in the lower edge portion within the plate width, the insertion receptacles being open toward an underside of the edge guard and configured to receive runner segments in the insertion receptacles.

2. The edge guard of claim 1, wherein:
the lower edge portion includes a plurality of cutouts spaced apart by webs, each cutout extending through the metal plate from one lateral plate surface to the other lateral plate surface; and
further comprising first and second sheet metal partitions received in the cutouts between the webs, the first and second sheet metal partitions being spaced apart so that each insertion receptacle is defined laterally between inner sides of the first and second sheet metal partitions.

3. The edge guard of claim 1, further comprising:
a plurality of runner segments, each runner segment including an elongated runner portion and an insertion projection extending upward from the runner portion and received in a respective one of the insertion receptacles.

4. The edge guard of claim 3, wherein:
each runner segment includes at least one stop surface engaging a complementary stop surface of the base part to limit insertion of the runner segment into its respective one of the insertion receptacles.

5. The edge guard of claim 3, wherein:
the insertion projection of each runner segment includes at least one integrally formed centering surface for guiding the insertion projection into its respective one of the insertion receptacles.

6. The edge guard of claim 3, wherein:
the runner portion has a runner portion length in a running direction and a runner portion width transverse to the running direction; and
the insertion projection has an insertion projection height in an insertion direction, wherein the insertion projection height is greater than the runner portion width.

7. The edge guard of claim 3, wherein:
each runner segment includes one and only one insertion projection.

8. An edge guard for a road milling machine or a soil working machine, the edge guard comprising:
a base part having an edge portion having a plurality of insertion receptacles defined in the edge portion and configured to receive runner segments in the insertion receptacles; and
a plurality of runner segments, each runner segment including an elongated runner portion and an insertion projection extending upward from the runner portion and received in a respective one of the insertion receptacles;
wherein each insertion projection includes a clamp element including one or more elastic protrusions resiliently engaging an inner surface of its respective one of the insertion receptacles to hold the insertion projection within the insertion receptacle.

9. The edge guard of claim 8, wherein:
the insertion projection of each runner segment has a recess defined therein and the clamp element is received in the recess with the one or more elastic protrusions extending out of the recess.

10. The edge guard of claim 9, wherein:
the recess extends laterally through the insertion projection and the clamp element has elastic protrusions extending out of two opposite sides of the insertion projection.

11. The edge guard of claim 9, wherein:
the insertion projection of each runner segment has first and second oppositely facing side surfaces, having first and second recesses, respectively, defined therein;
the first mentioned clamp element is received in the first recess of the first side surface and a second clamping element is received in the second recess of the second side surface, and the elastic protrusions of the first and second clamping elements extend in opposite directions from the insertion projection.

12. The edge guard of claim 11, wherein:
the first and second recesses are offset from each other in a running direction of the edge guard.

13. The edge guard of claim 8, wherein:
each insertion projection and its associated clamping element provide an unbolted connection to the base part.

14. The edge guard of claim 8, wherein:
the elastic protrusions are shaped as louvers.

15. The edge guard of claim 8, wherein:
the elastic protrusions are arrow-shaped and point in an insertion direction.

16. The edge guard of claim 9, wherein:
each insertion projection includes two lateral side surfaces, and each recess is open to only one of the lateral side surfaces of the insertion projection.

17. The edge guard of claim 9, wherein:
each insertion projection includes two lateral side surfaces, and each recess extends laterally through the insertion projection and is open to both lateral side surfaces of the insertion projection.

18. The edge guard of claim 9, wherein:
the recess is located asymmetrically in a running direction to a longitudinal center axis of the insertion projection.

19. The edge guard of claim 9, wherein:
each insertion projection includes two lateral side surfaces, and the recess is a first recess communicated with one of the opposite lateral side surfaces of the insertion projection, and the insertion projection further includes a second recess communicated with the other of the opposite lateral side surfaces of the insertion projection.

* * * * *

UNITED STATES PATENT AND TRADEMARK OFFICE
CERTIFICATE OF CORRECTION

PATENT NO.        : 9,745,705 B2
APPLICATION NO.   : 14/806711
DATED             : August 29, 2017
INVENTOR(S)       : Ley et al.

It is certified that error appears in the above-identified patent and that said Letters Patent is hereby corrected as shown below:

On the Title Page

Item (72) Inventors is corrected to read:

Herbert Ley, St. Katharinen (DE);
Philip Verhaelen, Köln (DE);
Cyrus Barimani, Königswinter (DE)

Signed and Sealed this
Ninth Day of January, 2018

Joseph Matal
*Performing the Functions and Duties of the*
*Under Secretary of Commerce for Intellectual Property and*
*Director of the United States Patent and Trademark Office*